Figure 3:
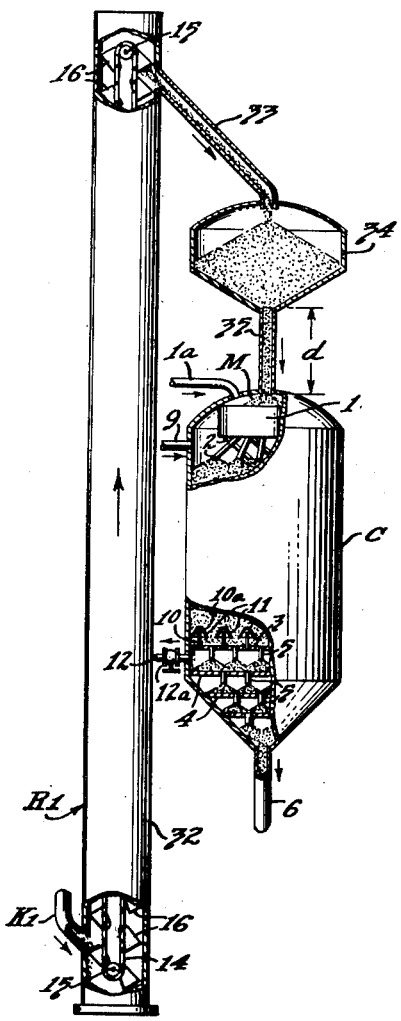

April 22, 1952 J. W. BARKER 2,593,404
METHOD OF SEALING HYDROCARBON CONVERSION HOUSINGS
Filed Dec. 31, 1947 2 SHEETS—SHEET 1
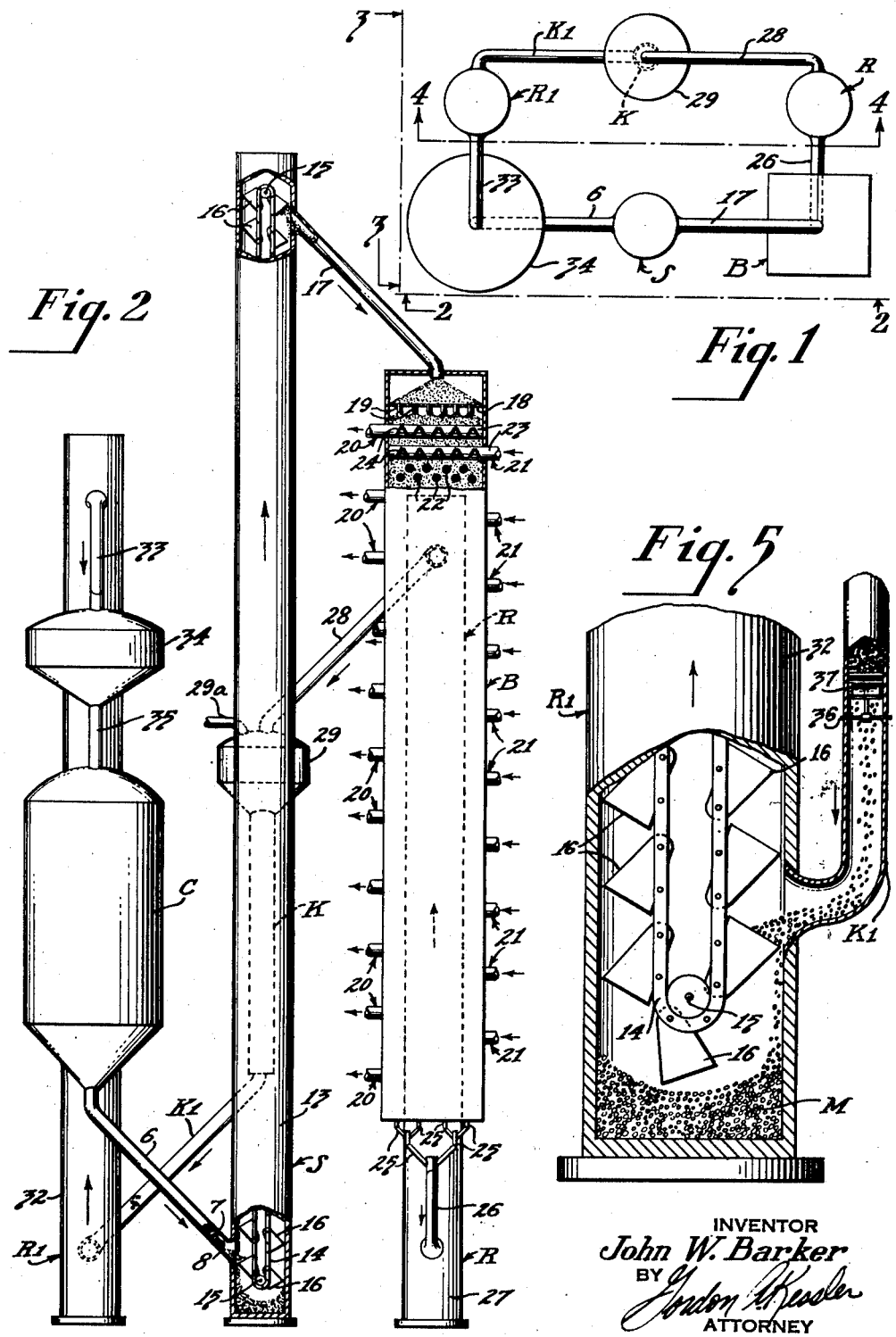
INVENTOR
John W. Barker
BY
ATTORNEY April 22, 1952   J. W. BARKER   2,593,404
METHOD OF SEALING HYDROCARBON CONVERSION HOUSINGS
Filed Dec. 31, 1947   2 SHEETS—SHEET 2

INVENTOR
John W. Barker
BY
ATTORNEY

Patented Apr. 22, 1952

2,593,404

UNITED STATES PATENT OFFICE 2,593,404

METHOD OF SEALING HYDROCARBON CONVERSION HOUSINGS

John W. Barker, Mount Vernon, N. Y., assignor to Houdry Process Corporation, Wilmington, Del., a corporation of Delaware Application December 31, 1947, Serial No. 795,013

3 Claims. (Cl. 196—52)

My invention relates to a method of sealing hydrocarbon conversion housings to prevent passage of hydrocarbon vapors upwardly through the conduit which supplies contact material thereto.

In hydrocarbon conversion systems of known character, regenerated contact material is admitted to a conversion or reaction housing after gravitating passage through a vertical conduit which opens through the top housing wall, movement of this gravitating contact material being restricted or impeded so that it moves through said conduit in solid column fashion. After admission to the housing, the contact material gravitates therethrough in solid bed fashion and, as the conversion operation proceeds, a hydrocarbon vapor or back pressure is developed interiorly of the upper housing portion above said bed. In order to prevent passage of these vapors upwardly through the aforesaid vertical conduit, it is customary for a gaseous sealing medium to be admitted to said upper housing portion where, for the purpose stated, it is maintained at pressure slightly exceeding that of the hydrocarbon vapors. The gaseous sealing medium flows upwardly through the vertical conduit, counter-current as regards the descending contact material, and at some location beyond the upper end thereof is vented to the atmosphere. As a result, depending on known factors, it often is necessary for said vertical conduit to have height substantially greater than that required by other apparatus which is associated with the described conversion or reaction housing to form a complete conversion-regenerating system. This disadvantage is overcome in a novel manner as hereinafter described.

A conversion-regenerating system of the character referred to above usually comprises vertical conversion and regenerating housings traversed by contact material which gravitates therethrough in solid bed fashion. By a suitable arrangement, spent contact material is elevated from the lower end of the conversion housing to the upper end of the regenerating housing and, simultaneously, regenerated contact material is elevated from the lower end of the regenerating housing to the upper end of the conversion housing. In accordance with my invention, the regenerated contact material is transported initially to an upper level for passage in solid column fashion downwardly through a conduit which forms the terminal of a sealed path leading to and utilizable for conveying the regenerated contact material to the upper end of the conversion housing. The gaseous sealing medium described above passes through the solid column contact material traversing the aforesaid conduit in counter-current relation and then passes to the atmosphere.

More particularly, in accordance with the invention, the regenerated contact material is moved upwardly through a vertical elevator housing during transportation thereof to an upper level for passage in solid column fashion downwardly through a conduit as aforesaid and, after downward passage through this conduit, the regenerated contact material is moved upwardly through another elevator housing for subsequent passage through a downwardly extending conduit which leads to the upper end of the conversion housing. With an arrangement of this character, both of said conduits and the last named elevator housing are included in the aforesaid sealed path and the length of the last named conduit is such that it increases the length of said sealed path to a desired extent for the purpose hereinafter stated.

Various other objects and advantages of my invention will become apparent from the following detailed description.

My invention resides in the method of sealing hydrocarbon conversion housings, features and arrangements of the character hereinafter described and claimed.

Figure 4:
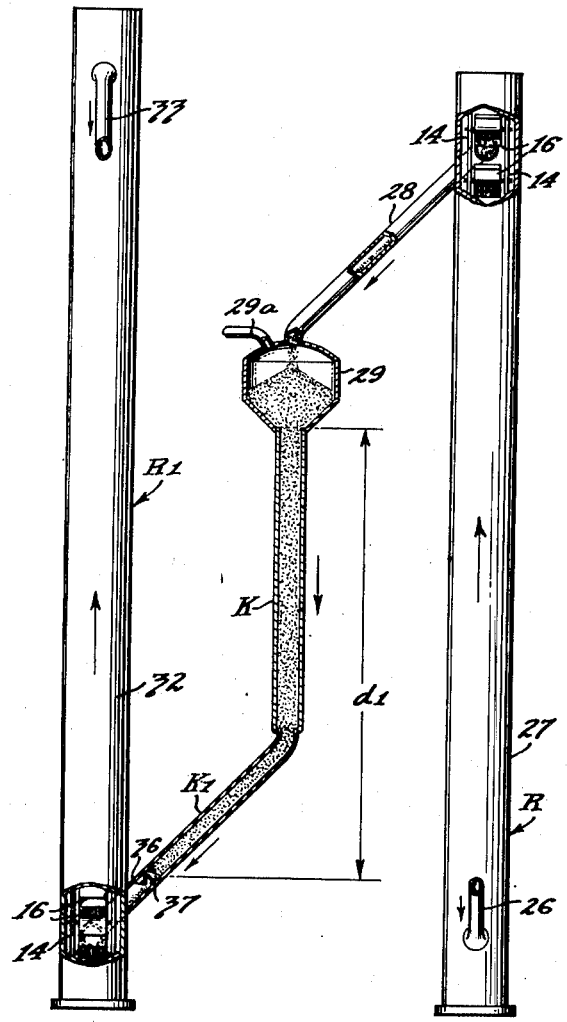

For an understanding of my invention and for an illustration of one form of apparatus with which the invention may be practiced, reference is to be had to the accompanying drawings, in which:

Fig. 1 is a plan view showing a conversion-regenerating system of the invention;

Figs. 2, 3 and 4 are elevational views, partly in section, taken on the respective lines 2—2, 3—3 and 4—4 of Fig. 1 looking in the direction of the arrows; and Fig. 5 is an enlarged, vertical sectional view, partly in elevation, showing a detailed feature of the invention.

Referring to Figs. 1 and 2, I have shown a system utilizable for converting hydrocarbons in the presence of contact material adapted, during on-stream operation, to gravitate through a conversion zone and, during regeneration, to gravitate through a regenerating zone. As illustrated, the aforesaid system may comprise a housing C which defines the conversion zone, a housing B which defines the regenerating zone, a downwardly extending or vertical conduit K adapted to be traversed by regenerated contact material which gravitates therethrough in solid column fashion, and vertical elevators S, R and R1 utilizable, respectively, for conveying spent and regenerated contact material from lower to upper levels.

The conversion housing C and associated apparatus may be of any suitable character. As shown particularly in Fig. 3, there is supported at the top of the housing C a hopper 1 to which regenerated contact material M is admitted continuously in the manner hereinafter described. Depending from and communicating with the hopper 1 are a plurality of pipes 2 through which the contact material passes to form a gravitating bed of contact material, the lower surface of which may be defined by a tube sheet 3 horizontally supported in the lower portion of the housing C. As the conversion operation proceeds, contact material M is admitted to the housing C as described above and moves downwardly therethrough under the influence of gravity while a deposit of carbonaceous material is formed thereon.

Any suitable arrangement may be utilized for discharging the spent contact material M from the housing C. To this end and as diagrammatically indicated, a plurality of spaced tube sheets 4 may be secured to the interior surface of the lower end portion of the housing C below the aforesaid tube sheet 3, the extreme lower end portion of said housing C, preferably, being conical as illustrated. A plurality of suitably spaced tubes or pipes 5 open through and depend from each of the tube sheets 3 and 4. As known in the art, the tubes 5 on successively lower tube sheets progressively decrease in number and the internal diameter thereof progressively increases whereby the contact material gravitates through the lower conical end portion of the housing C so as to reach and traverse a main discharge pipe or conduit 6 which should be suitably inclined as illustrated. In known manner, a valve 7 mounted on a shaft 8, Fig. 2, and controlled as hereinafter described is utilized to restrict the gravitating flow of the spent contact material through said conduit 6 for the purpose hereinafter described.

When hydrocarbon material is to be cracked in the housing 1, the contact material C hereinbefore referred to should be catalytic in character and the temperature thereof, upon admission to the housing 1, should range between 800° F. and 1000° F. or higher for example, about 900° F. Any suitable kind of catalytic contact material may thus be utilized such, for example, as activated clay pellets, or synthetic silica-alumina pellets or beads, etc. having suitable major dimensions such as between $\frac{1}{16}$ and $\frac{3}{4}$ of an inch. Other suitable catalysts for cracking include synthetic plural oxide composites, silicious or non-silicious in character and containing for example, zirconia, alumina or beryllia. In lieu of a cracking operation, other types of conversion operations such, for example, as one wherein hydrocarbon material of the character referred to below is desulphurized under known conditions with catalytic contact material of the general character referred to above, or equivalent. Or, reforming or dehydrogenation of naphthas or other normally liquid hydrocarbons may be effected in the presence of the above or other desired types of catalyst, certain of which are well known in the art. In lieu of the conversion operations described above, heavy hydrocarbon material may be vaporized and viscosity-broken in the presence of inert contact material of known character.

During operation with suitable cracking contact material, vapors such, for example, as vaporized gas oil, naphtha, or lighter hydrocarbons having suitable elevated temperature, as in a range from 850° F. to 950° F., are admitted continuously by a pipe 9 to the housing C above the upper surface of the bed of contact material. In the manner hereinafter described, these hydrocarbon vapors, as the conversion operation proceeds, pass concurrently as regards the contact material gravitating through the housing C and, adjacent the lower end of said housing, any suitable arrangement may be provided for disengaging converted vapors from the contact material. To this end, as diagrammatically indicated, the aforesaid tube sheet 3 may support a plurality of tubes 10 which upstand therefrom and open therethrough, the tubes 10 supporting a plurality of suitably arranged channel members 11, or equivalent, which are disposed in inverted relation so that, in known manner, they may be utilized for disengagement of vapors from the contact material, the vapors thereafter entering the tubes 10 by way of passages 10a formed, respectively, therein. A pipe 12 opens through the wall of the housing C below the tube sheet 3 and communicates with the space above the adjacent conical piles of contact material. This pipe 12 has associated therewith a control valve 12a and is adapted to receive and conduct the converted vapors to any suitable destination, not shown. In known manner and by suitable means, not shown, a suitable gaseous medium, such as steam or flue gases is admitted to the lower portion of the housing C, below the pipe 12 and under pressure above that existing at the level thereof, to prevent passage of hydrocarbon vapors through the conduit 6.

The lower end of the aforesaid conduit 6 opens into the lower end of the housing 13 for the elevator S which may be of conventional character or otherwise as may be desirable. As indicated in Fig. 2, the elevator S may comprise a pair of side-by-side, endless carriers 14 which are supported by suitably mounted upper and lower rotatable members 15. The carriers 14 are operated continuously by suitable mechanism, not shown, and they have elevator buckets 16 secured thereto in suitable manner. The buckets 16 receive the spent contact material from the lower end of the conduit 6 and elevate the same to the upper end of the elevator housing 13 where it is discharged into the upper end of a downwardly inclined pipe or conduit 17 which is suitably connected, in communicating relation, with said upper end of the housing 13.

The spent contact material which has been elevated as described immediately above gravitates through the conduit 17 and, in any desired manner, is admitted to the upper end of the regenerating housing B which together with its associated apparatus may be of conventional character or otherwise as may be desirable.

Thus, as shown in Figure 2, the aforesaid conduit 17 may extend through the top wall of the housing B at the center thereof so as to discharge the spent contact material on a tube sheet 18 horizontally secured in the top portion of said housing B. Opening through and depending from this tube sheet 18 are a plurality of tubes 19 through which the spent contact material, by action of gravity, passes into and then through the regenerating zone proper which, if desired but not necessarily, may have disposed therein an upper disengager 20 below which is disposed an upper engager 21 having an upper set of cooling coils 22 disposed therebelow.

The disengager 20 and engager 21 may be of any suitable construction and, as herein diagrammatically shown, each may comprise a horizontal pipe 23 fixed transversely in the housing B and intersecting the longitudinal axis thereof, each pipe 23 carrying a plurality of inverted channel members 24 extending horizontally from opposite respective sides thereof.

As known in the art, the housing B, throughout the height thereof, may carry sets of disengagers 20 and engagers 21 alternately arranged with a group of cooling coils 22 disposed between each engager and the adjacent disengager as shown in Fig. 1. By each of the engager pipes 23 and the associated channel members 24, air or other suitable regenerating medium is engaged with the gravitating contact material to burn carbonaceous material therefrom with consequent elevation in temperature thereof, the resulting flue gases being disengaged from the contact material at the channel members 24 of the disengager pipes 23 and passed from the housing B by way of the pipes last named. In known manner, a suitable cooling medium, such as water, fused salts or the like is passed through the coils 22 in order to lower the temperature of the contact material after it passes each engager 21.

Any suitable draw-off arrangement may be utilized for discharging the regenerated contact material from the housing B. Thus, for example, this arrangement may be of the character disclosed in pending application Serial No. 734,680, filed March 14, 1947, wherein regenerated contact material is shown as traversing groups of vertical pipes 25 disposed, respectively, at different horizontal levels. The pipes in successively lower groups progressively decrease in number and the internal diameter thereof progressively increases so that, eventually, the regenerated contact material reaches and, under the influence of gravity, traverses an inclined pipe or conduit 26 which opens into the lower end of the housing 27 for the aforesaid elevator R. In known manner, a suitably controlled valve, not shown, may be disposed in the conduit 26 and utilized for restricting gravitating flow of regenerated contact material therethrough so that, in said draw-off arrangement and in the housing B, the regenerated contact material gravitates downwardly in solid column or bed fashion.

The buckets 16 of the elevator R, which may be mechanically the same as the hereinbefore described elevator S, receive the regenerated contact material from the lower end of the conduit 26 and elevate the same to the upper end of said elevator R where it is discharged into the upper end of a downwardly inclined pipe or conduit 28 which communicates with a hopper 29 disposed at the top of and communicating with the aforesaid downwardly extending pipe or conduit K. As indicated in Fig. 4, the top wall of the hopper 29 may comprise a vent 29a opening to the atmosphere. The regenerated contact material gravitates through the conduit 28 and then, as hereinafter described, moves under the influence of gravity in solid column fashion through the hopper 29 and conduit K, said contact material thereafter gravitating through the lower extension of the conduit K, namely, the downwardly inclined pipe or conduit K1 which extends from the lower end of the conduit K and communicates with the bottom of the housing 32 for the aforesaid elevator R1 which may be mechanically the same as the elevators hereinbefore described. By the buckets 16 of the elevator R1, the regenerated contact material passing thereto from the pipe K1 is elevated to the top of the elevator last named and discharged into a downwardly inclined pipe or conduit 33 through which said regenerated contact material moves under the influence of gravity prior to gravitational movement thereof through a hopper 34 and a downwardly extending or vertical conduit 35, the latter communicating with the hereinbefore described hopper 1 at the top of the housing C.

In accordance with the invention, a part of the system described above forms a path which, throughout the length thereof, is sealed from the atmosphere and utilizable in the manner hereinafter described. This sealed path, in the form of the invention herein shown, extends from the top of the housing C by way of the pipe 35, the hopper 34, the pipe 33, the housing 32 of the elevator R1, the pipe K1, the pipe K, the hopper 29 and then communicates with the atmosphere by way of the vent 29a.

During operation of the disclosed system, the position of the valve 7, Fig. 2, may be controlled automatically in known manner, for example, as disclosed in application Serial No. 719,730, filed January 2, 1947, now Patent No. 2,528,537, in response to change in level of the upper surface of the contact material in the receptacle 34. By the valve 7, gravitational movement of the contact material along a path extending from the level thereof in the receptacle 34, through the conduit 35, the housing C and the portion of the pipe 6 above said valve 7 is restricted or impeded so that, throughout the length of said path, the contact material moves in solid column fashion.

As will be understood, the hydrocarbon vapors admitted to the housing C, Fig. 3, by way of the pipe 9 are subjected to a definite pressure drop while traversing said housing, the tubes 10, the pipe 12 and such equipment as is connected in circuit therewith. In order to produce the desired concurrent flow of the hydrocarbon vapors with respect to the gravitating contact material in the housing C, it necessarily follows, then, that said hydrocarbon vapors should be admitted to the housing C at a pressure sufficient to overcome the aforesaid pressure drop to suitable degree. At the same time, the operation should be conducted under conditions such that the hydrocarbon vapors do not pass upwardly through the pipe 35.

To this end, a suitable gaseous sealing medium, such as flue gases, steam, or equivalent, is admitted continuously to the top of the housing C above the hopper 1 by way of a pipe 1a, Fig. 3, at a pressure slightly exceeding that at which the hydrocarbon vapors are admitted to the housing C by way of the pipe 9. Due to this operation, the hydrocarbon vapors are prevented from passing upwardly through the vertical conduit 35 and the major portion, usually, of the sealing medium passes to the atmosphere along the above described sealed path. Also, by the described operation, the hydrocarbon vapors are caused to flow in desired concurrent relation as regards the gravitating contact material in the housing C.

Initially, the aforesaid major portion of the sealing medium passes, counter-current to the descending contact material, upwardly along that part of the sealed path defined by the vertical conduit 35, the receptacle 34 and the pipe 33. By reason of the described restricted or impeded flow of the contact material traversing the vertical conduit 35, which defines and is an example of one downwardly extending path portion as set forth in claim language, a compact downwardly moving column of the material is provided, through which the passage of gas establishes a pressure gradient effective principally throughout the vertical distance $d$, Fig. 3.

In connection with the foregoing, the pressure gradient through the receptacle 34 is insignificant by reason of the substantially larger diameter thereof compared with that of the pipe 35. Moreover, the contact material traversing the pipe 33 falls freely under the influence of gravity except for frictional retardation on the interior surface thereof and, accordingly, the pressure gradient therethrough is nil or substantially so.

After passage of the aforesaid major portion of the sealing medium along that part of the sealed path described above, said sealing medium enters and passes downwardly through the housing 32 of the elevator R1 which, as stated, is sealed from the atmosphere. Thereupon, as described below, said major portion of the sealing medium leaves the bottom of said elevator housing and traverses the remaining part of the sealed path.

In accordance with the invention and as illustrated in Figs. 4 and 5, the lower end of the aforesaid pipe K1 carries a shaft 36 on which a valve 37 is mounted. The position of this valve may be manually or otherwise suitably controlled so that it restricts or impedes gravitational movement of the regenerated contact material along the portion of the sealed path extending from the level thereof in the hopper 29, through the pipe K and then through that portion of the inclined pipe K1 above the valve 37, this path portion being an example of another downwardly extending path portion as set forth in claim language. Accordingly, by reason of the described restricting or impeding action of the valve 37, the regenerated contact material gravitates in solid column fashion along the path portion noted immediately above.

As stated above, the major portion of the sealing medium leaves the bottom of the sealed elevator housing 32. Thereafter, this sealing medium flows through the path portion described immediately above as being traversed by the regenerated contact material in solid column fashion, said sealing medium, as the operation proceeds, passing to the atmosphere by way of the vent 29a in the hopper 29. In this path portion, a pressure gradient is effective through a vertical distance $d_1$, Figure 4, the pressure gradient through the hopper 29 being negligible for the reason hereinbefore stated with respect to the hopper 34.

In view of the foregoing, it follows that a portion of the sealing medium which is admitted to the conversion housing C by way of the pipe 1a passes counter-current to the contact material gravitating in solid column fashion through the path portion defined by the vertical conduit 35, and through the path portion defined by the inclined pipe K1 and the vertical pipe K. The length of these path portions is such that the pressure gradient therethrough is insufficient to stop downward flow of the contact material against the up-flowing sealing medium.

In the form of the invention herein shown and as indicated in Fig. 2, the height of the elevator S for transporting the spent contact material is controlling as regards the over-all height of the system. Obviously, within the limit imposed by the height of said elevator S, the height of the elevator R may be selected so that the vertical distance $d_1$ is as indicated in Fig. 4 or even substantially greater if desired. By reason of this latitude, the vertical distance $d$, Fig. 3, may have a selected small magnitude which may be even nil or substantially so. Obviously, aside from the fixed factors involving the height of the housing C and the hopper 34 together with the vertical height required for the inclined pipes 6 and 33, the distance $d$ is controlling as regards the height of the elevator R1 for the regenerated contact material. Since the distance $d$ may have the negligible magnitude just stated, it follows that the height of the elevator R1 need be no greater than that imposed by the aforesaid fixed factors.

In prior practice, as regards a conversion-regenerating system of the general character herein disclosed, it is customary for the regenerated contact material to pass from the upper end of its elevator by way of an inclined pipe which communicates with a surge hopper, such as the hopper 34 herein disclosed, the surge hopper first noted communicating, in turn, with a vertical pipe which extends into the upper end of the conversion housing. This pipe has vertical height below the surge hopper sufficient for the intended purpose. With this prior art arrangement, the vertical height of the aforesaid pipe together with that of the surge hopper and the inclined pipe admitting contact material thereto determines the height of the elevator which supplies regenerated contact material to said last named inclined pipe. Aside from this, the overall height of the system, ordinarily is dependent on the height of that portion of the elevator which extends above the regenerating housing so that spent contact material may be passed thereto by way of the sloping pipe provided for this purpose. Often, in prior art practice, the required vertical height of the aforesaid pipe causes the height of the elevator for the regenerated contact material to be substantially greater, for example, twenty-five to fifty feet greater than is required by any other part of the system.

In accordance with my invention and by utilization of the path portion indicated at $d_1$, Fig. 4, the necessary height of the elevator R1 for the regenerated contact material may be substantially reduced compared with prior practice as referred to above. Thus, for example and as shown on the drawing, the height of the elevator last named may be substantially less than the height of the elevator S which transports spent contact material upwardly for admission to the regenerating housing. Accordingly, as previously stated, the height of said elevator S is controlling as regards the over-all height of the conversion-regenerating system.

Obviously, substantial reduction in height of the elevator for the regenerated contact material as referred to above is desirable because reducing the expense of installation and maintenance. Again, decreased elevator height renders the prospect of continuous operation more favorable and this, of course, is highly desirable. As disclosed herein, the over-all height of the conversion-regenerating system is reduced to substantial extent and this is desirable because reducing the expense, simplifying the construction and operation, and lessening the hazard of air travel particularly when the system is located in the immediate vicinity of an airport.

If desired and in accordance with the general disclosure of my application filed of even date herewith Serial No. 795,014 filed December 31, 1947, the regenerating housing B may be pressurized in the sense that pressure in excess of that of the atmosphere is maintained therein during the regenerative operation. If so, this excess pressure effect decreases the pressure gradient between the regenerating housing and the location where the sealing medium is admitted to the conversion housing. This results in decrease in length of the path traversed by contact material gravitating in solid column fashion through which the sealing medium flows in counter-current relation.

It shall be understood that, except as set forth in claim language, there is to be no limitation of the invention to the disclosed arrangement involving admission of the gaseous sealing medium to the housing C by way of the conduit 1a. Thus, within a broader aspect of the invention, the gaseous sealing medium may be admitted to the described sealed path at any desired location provided, first, that said gaseous medium is present throughout the length thereof so as to be maintained, in the upper part of the housing C, at pressure slightly greater than that of the hydrocarbon vapors and, second, that it passes through the solid column contact material gravitating through one or more of the described path portions.

It was hereinbefore stated that the gaseous sealing medium passes to the atmosphere by way of a vent 29a provided in the top wall of the surge hopper 29. However, the invention is not to be thus limited because, obviously, this vent may be otherwise provided, for example, in the housing 27 for the elevator R.

When contact material gravitates in an impeded or restricted manner through an inclined pipe, it is necessary for this pipe to be related to a horizontal plane by an angle of at least approximately 45 degrees. As regards the disclosed system, the foregoing applies to the described pipes 6, 26 and KI. When contact material traversing an inclined pipe falls freely under the influence of gravity except for frictional retardation on the interior surface thereof, the angle of inclination may be somewhat less than as stated above. This applies to the described pipes 17, 28 and 33.

It will be understood that the invention is not to be limited to the disclosed conversion operation which involves admission of hydrocarbon vapors to the top of the housing C for passage therethrough in concurrent relation as regards the gravitating contact material. Obviously, the invention is applicable to conversion operations of other types such, for example, as one wherein hydrocarbon vapors pass counter-current as regards the gravitating contact material or wherein the charge, partly in liquid phase, is admitted into the upper portion of the conversion housing for downward passage therethrough along with hydrocarbon vapors.

Each of the appended claims includes a reference to a sealed path arrangement such, for example, as "said path portions and the part of said path connecting them together being sealed from the atmosphere throughout the length thereof." It shall be understood that such references are intended to be descriptive of sealed path arrangements wherein the pressure of the gases therein is maintained in excess of that of the atmosphere even though some of the gases may pass to the atmosphere, for example, through a throttled vent.

Obviously many modifications and variations of the invention as hereinbefore set forth may be made without departing from the spirit and scope thereof and therefore only such limitations should be imposed as are indicated in the appended claims.

I claim:

1. In a hydrocarbon conversion system in which solid contact material is passed cyclically through separate zones wherein said material is contacted with different gases under different gaseous pressures, the method of transferring said contact material between said zones while maintaining a substantial gas seal therebetween which comprises the steps of passing said contact material from the contact zone of lower gaseous pressure downwardly in a confined path as a compact moving column, elevating said contact material from the lower end of said column through an elongated confined elevator path having substantially uniform pressure throughout, passing all said contact material from the top of said elevator path downwardly in a second confined path, said contact material gravitating as a compact moving column through at least a portion of said second confined path, elevating said contact material from the lower end of said second confined path through a second elongated confined elevator path having substantially uniform pressure throughout, passing all said contact material from the top of said second elevator path downwardly in a third confined path, said contact material gravitating as a compact moving column through at least a portion of said third confined path, introducing said contact material at the lower end of said third confined path into the contact zone of higher gaseous pressure, introducing a gaseous sealing medium at a low point in the compact moving column of said third confined path to provide a pressure thereat greater than the pressure in said contact zone of higher pressure, passing said sealing medium countercurrently to said contact material through said third confined path, said second elevator path, and into said second confined path, and venting said gaseous sealing medium to the atmosphere at a point above the compact column in said second confined path.

2. A method as defined in claim 1 wherein said elongated confined elevator paths are of sufficient cross-section area to permit the elevation of said contact material therethrough in separated mass formation and to provide a continuous unobstructed flow path with substantially no pressure drop therethrough for said gaseous sealing medium.

3. A method as defined in claim 2 in which there is a continuous seal from the atmosphere through said second and third confined paths for passing said contact material downwardly and the second elevator path therebetween for elevating said material.

JOHN W. BARKER.

REFERENCES CITED

The following references are of record in the file of this patent:

UNITED STATES PATENTS

| Number | Name | Date |
|---|---|---|
| 2,311,564 | Munday | Feb. 16, 1943 |
| 2,443,180 | Bergstrom | June 15, 1948 |
| 2,443,412 | Bergstrom et al. | June 15, 1948 |